United States Patent [19] [11] 3,959,739
Hutcheson et al. [45] May 25, 1976

[54] ELECTRO-OPTIC TUNING OF ORGANIC DYE LASER

[75] Inventors: Lynn D. Hutcheson, Ridgecrest; Richard S. Hughes, China Lake, both of Calif.

[73] Assignee: The United States of America as represented by the Secretary of the Navy, Washington, D.C.

[22] Filed: Feb. 3, 1975

[21] Appl. No.: 546,651

[52] U.S. Cl. .................... 331/94.5 C; 350/160 R
[51] Int. Cl.² .......................................... H01S 3/10
[58] Field of Search ............ 331/94.5; 350/160, 161

[56] References Cited
UNITED STATES PATENTS 3,437,951 4/1969 Dailey ............................... 331/94.5
3,613,024 10/1971 Geusic et al. ...................... 331/94.5

Primary Examiner—William L. Sikes
Attorney, Agent, or Firm—R. S. Sciascia; Roy Miller; Robert W. Adams

[57] ABSTRACT

An electro-optically tuned organic dye laser having an electro-optic cell and a diffraction grating. A varying electrical field is supplied to the cell to cause the laser beam to be swept across the stationary diffraction grating which reflects a specific wavelength for each angle of incidence.

5 Claims, 2 Drawing Figures

ELECTRO-OPTIC TUNING OF ORGANIC DYE LASER

BACKGROUND OF THE INVENTION

The broad band laser emission observed from organic dye lasers provides a source of continuously tunable coherent radiation. Dye laser tuning was first accomplished in 1967 by Soffer and McFarland by replacing the back reflector of the optical resonant cavity with a rotatable diffraction grating. Since that time other organic dye laser tuning techniques for producing narrow band laser emission have been devised, most of which have been electro-mechanical in design.

The disadvantages in using any tuning system that has moving parts, such as a rotatable diffraction grating or electro-mechanical devices, is its inherent limitation of operational tuning rate. The present invention is a tuning system having no moving parts. That is, tuning is accomplished by employing stationary components. Another such tuning system employs an accousto-optical cell and a diffraction grating, and an optional angle multiplier. It is disclosed by a present inventor, Richard Swart Hughes, in U.S. Pat. Application Ser. No. 374,476, entitled "Accousto-Optical Deflector Tuned Organic Dye Laser", filed June 28, 1973, which disclosure is included herein by reference. Therein the laser beam deflection is responsive to the radio frequency applied to the accousto-optical cell, and the light frequency reflected back into the system by the stationary diffraction grating is dependent on the angle of incidence of the diffracted beam onto the grating.

The present invention is tunable by employing an electro-optic beam deflection cell and a diffraction grating, and an optional angle multiplier. Beam deflection is responsive to the electrical field applied to the electro-optic crystal. The cell of the present invention has first and second crystalline wedges having separate indexes of refraction when subjected to the same electrical field, and are in contact diagonally of the laser beam such that each increment of the beam's cross-section is subjected to a differential change in index of refraction as the beam is transmitted through the cell. By employing electro-optics the tuning rate of the present invention is many times faster than that of the mechanical and the acousto-optic systems.

DESCRIPTION OF THE PREFERRED EMBODIMENT

Figure 1:
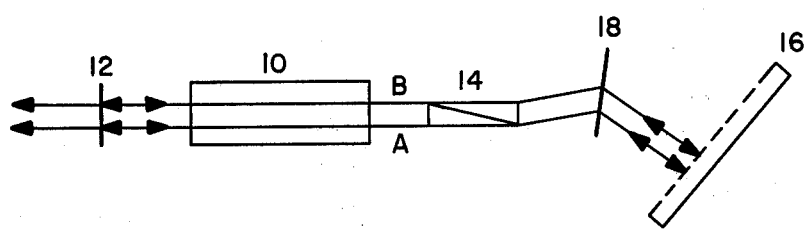
FIG. 1 is a plan view of the preferred embodiment of the present invention.

FIG. 1 shows the preferred embodiment of the present invention. The resonant cavity includes dye cell 10, partially reflective end mirror 12, electro-optic beam deflection cell 14, diffraction grating 16, and angle multiplier 18. The tuning system includes cell 14 that may be made by sandwiching two electro-optic crystals such as KD*P ($KD_2PO_4$) crystals diagonally with their Z axis oppositely oriented.

Electronic tuning is accomplished by an electro-optic beam deflection cell and fixed diffraction grating combination. Cell 14 is positioned within the resonant cavity in the laser beam path to deflect the beam in response to an electric field. Since the dye laser emission wavelength is determined by the angle or incidence of the intra-cavity beam upon diffraction grating 16, and since this angle can be varied by varying the electric field applied to cell 14, the output wavelength of the dye cell can be scanned simply by scanning the electric field applied to electro-optic cell 14.

Output mirror 12 provides partial transmission and partial reflection of broad band light over the laser's range of operating frequencies. The laser material of cell 10 may be any material that can be tuned, and especially includes organic dyes which can support either a continuously tunable mode or a multi-mode where the laser can be stepwise tuned. Diffraction grating 16 is applied in the Littrow configuration and is employed as a reflective element of the resonant cavity. For each angle-of-incidence that light impinges on grating 16, the grating reflectively returns a wavelength back along the path from which it came. So, if multichromatic light impinges on grating 16 at a specific, relatively high angle-of-incidence, a specific wavelength will be returned, assuming it is present in the beam of incident light. And, if it impinges at a specific, low angle-of-incident, a different specific wavelength will likewise be returned. Thereby, diffraction grating 16 acts as a wavelength selecting means by reversing the direction of a wavelength, with the wavelength reversed being determined by the angle-of-incidence of the light on the grating. That is, diffraction grating 16 is retrogressively reflective to a wavelength that impinges at its retrogressive angle-of-incidence.

The angle of incidence upon grating 16 is changed by changing the amount of beam deflection out of the electro-optic crystal 14. This in turn causes the laser to change wavelengths. Thereby, the laser is tuned.

The angular dispersion of grating 16 is defined by $$\frac{d\beta}{\lambda} = \frac{1}{\lambda} \tan \beta,$$

where $\beta$ is the diffraction angle and $\lambda$ is the wavelength. Angle multiplier 18 is optional but will probably be necessary if a relatively large optical band width is desired. When a telescope is used as angle multiplier 18, the angle multiplication factor is given by the ratio of focal lengths of the lens elements.

Some crystals exhibit certain properties such that when an electric field is applied to an electro-optic crystal, the optical index of refraction will vary. This variation of index of refraction depends linearly on the transverse dimension X, i.e. $n(x) = N_o + AX$. This variation in the refractive index will cause certain light rays to travel faster than other light rays thus causing the wavefront to change directions as is shown in FIG. 2.

Figure 2:
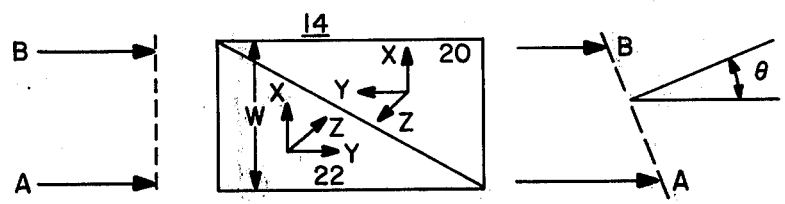
FIG. 2 is an enlarged plan view of the electro-optic beam deflection cell of the present invention.

As can be seen in FIGS. 1 and 2 ray A travels faster than ray B because of this change in refractive index along the X direction. Where the beam propogation is along Y, the beam is polarized in the X direction and the electric field is applied parallel to Z. The angle change is $$\theta = \frac{1}{w} \Delta n$$

where $\Delta n$ is the change in the index of refraction.

Such a beam deflector can be realized by sandwiching two KD*P ($KD_2PO_4$) crystals together diagonally as is shown. The two crystals have their Z axis oriented opposite one another. Other than that, they are identical. Ray A which propogates entirely in the lower crystal has an index of refraction $$N_A = N_o - \frac{N_o^3}{2} r_{63} E_Z$$

and ray B which propogates entirely in the upper crystal has an index of refraction $$N_B = N_o + \frac{N_o^3}{2} r_{63} E_Z,$$

where $N_o$ is the index of refraction of the ordinary optical wave $r_{63}$ is an electro-optic tensor which is dependent upon the crystal and $E_Z$ is the applied electric field parallel to the Z direction. This gives a change in refractive index $\Delta n = N_o^3 r_{63} E_Z$ and a beam deflection $$\theta = \frac{1}{w} N_o^3 r_{63} E_Z.$$

Electro-optic crystal 14 is a solid crystal which will exhibit the electro-optic effect. The crystal changes index of refraction when an electric field is applied to the crystal. One such crystal which can be used is KD*P ($KD_2PO_4$) which has $N_o^3 r_{63} = 80 \times 10^{-12}$ m/volt This is a large constant which is necessary for large deflections.

Operation of the present invention is as follows:

The organic dye of cell 10 is pumped and made to lase within the resonant cavity bounded by diffraction grating 16 and output mirror 12. An electric field is applied to electro-optic cell 14 causing the beam denoted by rays A and B to be deflected. Angle multiplier 18 amplifies the deflection angle, and thereby effectively increasing the tuning range per unit of electric field applied to cell 14. Diffraction grating 16 retrogressively reflects each wavelength that is incident thereon at its retrogressive angle-of-incidence and acts as the back mirror of the resonant cavity. The laser is tuned by varying the electric field applied to cell 14. Beam deflection occurs in response to the field applied and diffraction grating 16 is retrogressively reflective of the wavelength tuned to, causing the system to lase at the tuned wavelength.

The present invention includes no moving parts to limit the tuning rate. The tuning rate is limited only by the switching time of the electric field applied to the electro-optic cell. As a result, the tuning rate capability of the present invention is much faster than previous tuning techniques.

What is claimed is:

1. An electro-optic laser tuning system, comprising:
    a laser cavity including a lasing cell, and bounded at one end by a laser output mirror;
    reflecting means at the opposite end of said cavity for retrogressively reflecting those wavelengths that are incident thereon at the retrogressive angle unique to each wavelength; and
    laser beam deflecting means in said cavity and in the optical path between said cell and said reflecting means for electro-optically tuning the laser to oscillate at selected wavelengths in response to an electrical signal, including an electro-optic, beam deflection cell comprising a plurality of like members in contact, each having axial properties and a first, second and third axis, with the first axis of the first of said members oppositely oriented to the first axis of the second of said members.

2. The system of claim 1 wherein said reflecting means is a reflective diffraction grating.

3. The system of claim 2 wherein said system further comprises means positioned between said cell and said grating for modifying the angular deflection of the laser beam.

4. The system of claim 3 wherein said angular deflection modifying means is an angle multiplier lens system.

5. The system of claim 4 wherein said laser is an organic dye laser.

* * * * *